United States Patent
Cabanero

(10) Patent No.: US 9,031,961 B1
(45) Date of Patent: May 12, 2015

(54) USER DEVICE WITH ACCESS BEHAVIOR TRACKING AND FAVORITE PASSAGE IDENTIFYING FUNCTIONALITY

(75) Inventor: Christian R. Cabanero, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/050,886

(22) Filed: Mar. 17, 2011

(51) Int. Cl.
*G06F 17/30* (2006.01)

(52) U.S. Cl.
CPC .................. *G06F 17/30386* (2013.01)

(58) Field of Classification Search
USPC ............................................ 707/751; 704/200
See application file for complete search history.

(56) References Cited

U.S. PATENT DOCUMENTS

| | | | |
|---|---|---|---|
| 6,100,890 A | 8/2000 | Bates et al. | |
| 6,184,886 B1 | 2/2001 | Bates et al. | |
| 6,219,679 B1 | 4/2001 | Brisebois et al. | |
| 6,314,423 B1 | 11/2001 | Himmel et al. | |
| 6,839,680 B1 * | 1/2005 | Liu et al. | 705/7.33 |
| 7,099,896 B2 | 8/2006 | Fields et al. | |
| 8,150,967 B2 * | 4/2012 | King et al. | 709/224 |
| 2005/0251750 A1 | 11/2005 | Vallone et al. | |
| 2006/0253418 A1 * | 11/2006 | Charnock et al. | 707/1 |
| 2007/0154190 A1 * | 7/2007 | Gilley et al. | 386/125 |
| 2008/0126476 A1 * | 5/2008 | Nicholas et al. | 709/203 |
| 2009/0125499 A1 * | 5/2009 | Cross et al. | 707/5 |
| 2009/0138335 A1 * | 5/2009 | Lieberman | 705/10 |

\* cited by examiner

*Primary Examiner* — Shyue Jiunn Hwa
(74) *Attorney, Agent, or Firm* — Lowenstein Sandler LLP

(57) ABSTRACT

A user device presents passages of an electronic publication. The user device tracks a user's access behavior for the passages of the electronic publication. The user device identifies the user's favorite passages of the electronic publication based on the user's access behavior and stores an identification of the user's favorite passages.

23 Claims, 12 Drawing Sheets

USER DEVICE WITH ACCESS BEHAVIOR TRACKING AND FAVORITE PASSAGE IDENTIFYING FUNCTIONALITY

RELATED APPLICATIONS

The present application is related to co-pending U.S. patent application Ser. No. 13/050,884, filed Mar. 17, 2011, entitled "USER DEVICE WITH ACCESS BEHAVIOR TRACKING AND PASSIVE MARKING".

BACKGROUND OF THE INVENTION

A large and growing population of users enjoy entertainment through the consumption of electronic publications, such as electronic books (also referred to herein as ebooks), electronic newspapers, electronic magazines, audio recordings (e.g., audio books), video, films, etc. Users employ various electronic devices to consume such electronic publications. Among these electronic devices are electronic book readers, cellular telephones, personal digital assistants (PDAs), portable media players, tablet computers, electronic pads, netbooks, desktop computers, notebook computers, and the like.

Electronic book (ebook) readers record the last page of an electronic publication that has been read by a user. Therefore, when a user reopens the electronic publication the ebook opens to the last page read. If a user wants to record markers for multiple pages for easily returning to those pages, then the user must manually place bookmarks at those pages. This can become tedious if a user skips around within an electronic publication (e.g., reading multiple chapters or sections in parallel) because the user must then manually place new bookmarks at every stopping point.

Users may return to the same few pages of their favorite electronic publications numerous times. However, if a user hasn't read a particular electronic publication for a while, he may forget the specific pages that he likes to read. Therefore, the user may have to search through the electronic publication to find those pages. This can become tedious for a user.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

DETAILED DESCRIPTION OF THE PRESENT INVENTION

Methods and systems for tracking a user's access behavior with respect to an electronic publication and using the user's access behavior to generate passive markers and identify favorite passages are described herein. In one embodiment, a user device presents (e.g., displays) passages of an electronic publication. The user device tracks a user's access behavior for the passages of the electronic publication as the user reads, views or listens to the passages. The user device may track an amount of time that each passage is presented by the user device and a number of times that each passage is presented by the user device. The user device identifies the user's favorite passages of the electronic publication based on the user's access behavior. The user device may then store an identification of the user's favorite passages.

The user's favorite passage data may be used to enable the user to quickly open the electronic publication to the user's favorite passages. Additionally, the user's favorite passage data may be used to recommend additional electronic publications to the user. A content server may also use the favorite passage data from multiple users to determine what content of the electronic publication to display when listing the electronic publication for sale to other users.

Figure 1:
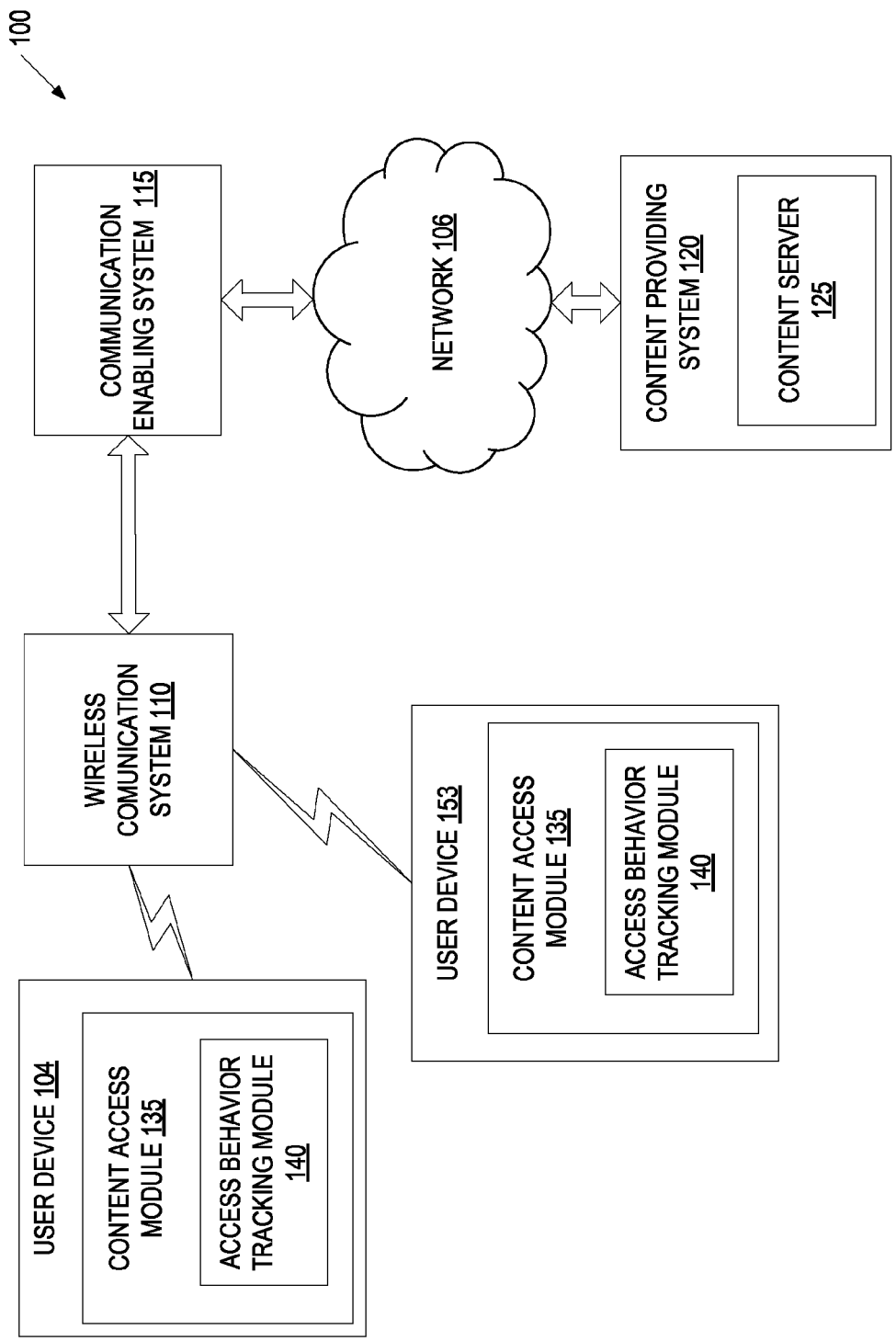
FIG. 1 is a block diagram of an exemplary network architecture, in which embodiments of the present invention may operate.

FIG. 1 is a block diagram of an exemplary network architecture 100, in which embodiments described herein may operate. The network architecture 100 may include a content providing system 120 and one or more user devices 104, 153 capable of communicating with the content providing system 120 via a network 106 (e.g., a public network such as the Internet or a private network such as a local area network (LAN)).

The user devices 104, 153 may be portable computing devices such as electronic book readers or tablet computers (e.g., that include a book reader application). Other examples of portable computing devices include cellular telephones, personal digital assistants (PDAs), portable media players, netbooks, and the like. The user devices 104, 153 may also be non-portable computing devices such as a desktop computer, a set-top box associated with a television, a gaming console, and so on. The user devices 104, 153 are variously configured with different functionality to enable consumption of one or more types of electronic publications. The electronic publications may be electronic books (ebooks) such as electronic textbooks, electronic magazines, digital newspapers, digital audio books, electronic journals, real simple syndication (RSS) feeds, etc. The electronic publications may also include digital video (e.g., movies, television, short clips, etc.), images (e.g., art, photographs, etc.), and multi-media content.

The content providing system 120 corresponds to any functionality or combination of functionality for providing electronic publications to the user devices 104, 153. The content providing system 120 includes a network-accessible server-based functionality (content server 125), various data stores (not shown), and/or other data processing equipment. The content providing system 120 may be implemented by a single machine or a cluster of machines. The content providing system 120 may include one or more machines (e.g., one or more server computer systems, routers, gateways, etc.) that have processing and storage capabilities to provide the server-based functionality.

In one embodiment, the content server 125 corresponds to an entity which provides electronic publications (e.g., electronic textbooks) to user devices upon users' purchase of the items. In this role, the content server 125 may essentially act as a bookseller or the like. In other cases, the content server 125 corresponds to an entity which provides electronic publications to users on a non-fee basis or on the basis of some other type of alternative compensation arrangement. Thus, the term a "provider" of items should be construed broadly to encompass educational institutions, governmental organizations, libraries, non-profit organizations, retailers, auction services, and so on, or some cooperative combination of any two or more entities.

The content server 125 delivers, and the user devices 104, 153 receive, electronic publications (or other media items), search results, upgrades, and/or other information via the network 106. For example, the user devices 104, 153 may download or receive ebooks from the content server 125. The content server 125 also receives various requests (e.g., search queries), instructions and other data from the user devices 104, 153 via the network 106.

Communication between the user devices 104, 153 and the content providing system 120 may be enabled via any communication infrastructure. One example of such an infrastructure includes a combination of a wide area network (WAN) and wireless infrastructure, which allows a user to use the user devices 104, 153 to purchase items (e.g., electronic publications) and consume items without being tethered to the content providing system 120 via hardwired links. The wireless infrastructure may be provided by one or multiple wireless communications systems, such as wireless communications system 110. Wireless communication system 110 may be a wireless fidelity (WiFi) hotspot connected with the network 106. Wireless communication system 110 may also be a wireless carrier system that can be implemented using various data processing equipment, communication towers, etc. Alternatively, or in addition, the wireless carrier system may rely on satellite technology to exchange information with the user devices 104, 153.

The communication infrastructure may also include a communication-enabling system 115 that serves as an intermediary in passing information between the content providing system 120 and the wireless communication system 110. The communication-enabling system 115 may communicate with the wireless communication system 110 (e.g., a wireless carrier) via a dedicated channel, and may communicate with the content providing system 120 via a non-dedicated communication mechanism, e.g., a public Wide Area Network (WAN) such as the Internet.

User devices 104 and 153 each include a content access module 135, which may be implemented in hardware, software, firmware, or a combination thereof. The content access module 135 includes functionality to enable consumption of one or more types of electronic books (ebooks) and/or other electronic publications (electronic versions of publications) such as electronic magazines, digital newspapers, electronic journals, real simple syndication (RSS) feeds, videos, images, digital films, etc.

The content access module 135 includes an access behavior tracking module 140. The access behavior tracking module 140 tracks a user's access behavior for passages of an electronic publication. This may include tracking the last accessed passages of one or multiple sections of electronic publications, tracking the frequency of access for each passage of an electronic publication, tracking the amount of time that each passage of an electronic publication is displayed, and so on. Based on the user's access behavior, the access behavior tracking module 140 may determine a user's favorite passages and/or automatically generate markers that can be used to return to specific passages (e.g., last passages read by a user, favorite passages of the user, etc.). Content access module 135 and access behavior tracking module 140 are described in greater detail with reference to FIG. 2 below.

Figure 2:
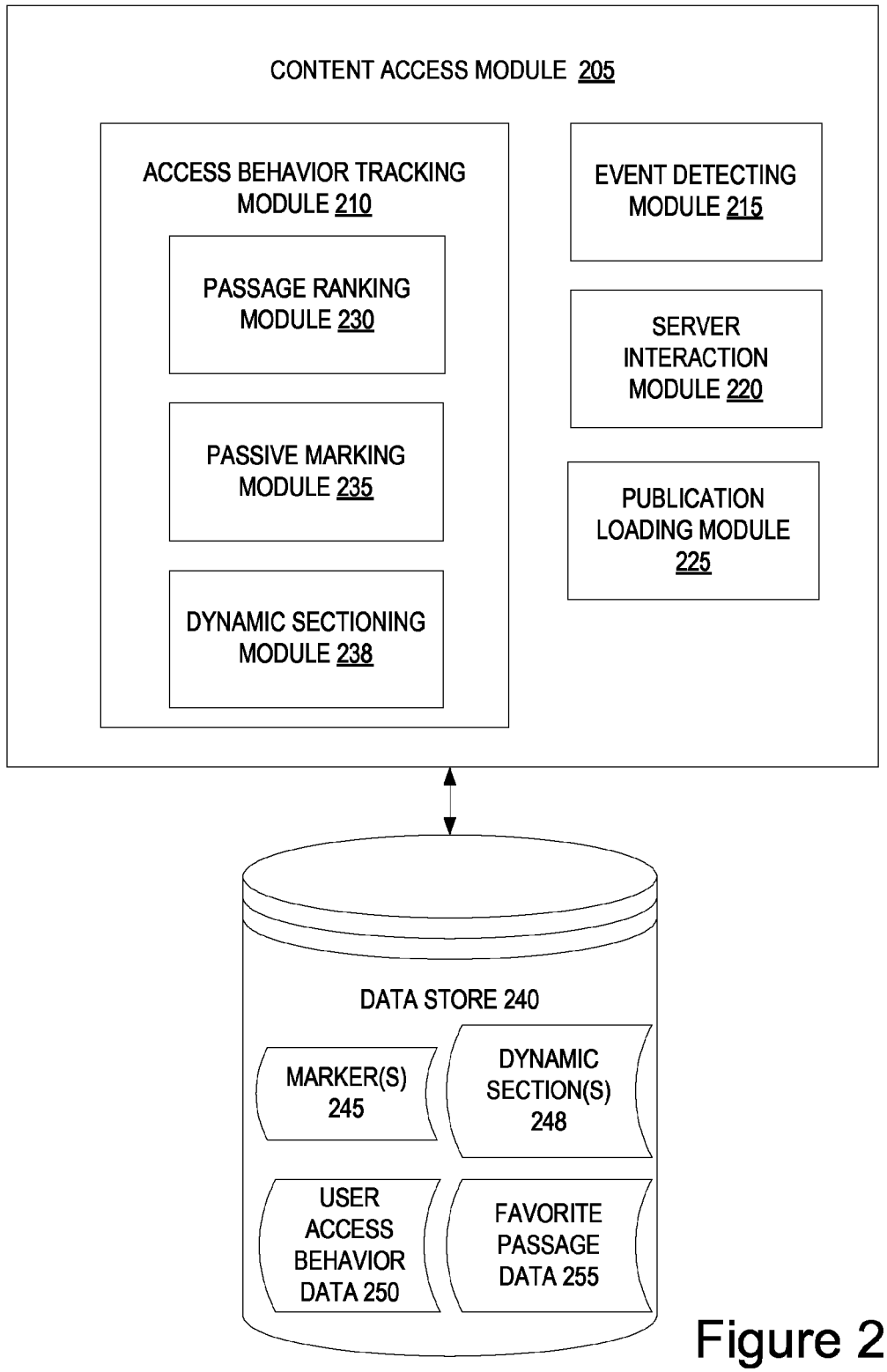
FIG. 2 is a block diagram illustrating one embodiment of a content access module.

FIG. 2 is a block diagram of one embodiment of a content access module 205. In one embodiment, content access module 205 corresponds to content access module 135 of FIG. 1. Content access module 205 presents electronic publications to users, which may include displaying text, displaying images, displaying video, playing music, playing other audio, etc. Content access module 205 may provide a user interface that a user can interact with to select and load electronic publications, play and pause electronic audio and/or video publications, switch pages for electronic print publications, etc. In one embodiment, content access module 205 includes an access behavior tracking module 210, an event detecting module 215, a server interaction module 220 and a publication loading module 225. In one embodiment, content access module 205 is connected to a data store 240, which may be a file system, database or other data management layer resident on a data storage device such as a disk drive, RAM, ROM, database, etc.

Electronic publications include a collection of passages. For electronic print publications, each passage may be a word, sentence, paragraph, page, table, image, etc. For electronic audio publications, each passage may be a spoken word, phrase, clip having a predetermined length (e.g., a 5 second audio clip), etc. For electronic video publications, a passage may be a frame, a sequence of frames, a clip having a predetermined length, etc. Each passage may be assigned a unique identifier and/or address that may be used to locate and operate on (e.g., display) the passage. The unique identifiers may be referred to as invariant reference identifiers. In one embodiment, each passage is assigned an address based on a byte offset for that passage from the beginning of the electronic publication. Access behavior tracking module 210 may use the identifiers/addresses of the passages to track user access behavior for those passages.

Passages of an electronic publication may be arranged into sections. Each section includes a contiguous sequence of passages. The sections may be static or may be dynamic. One example of static sections are chapters. For example, a first chapter of an electronic book may include passages having addresses 1-1000, a second chapter of the electronic book may include passages having addresses 1001-1900, etc.

In one embodiment, access behavior tracking module 210 includes a dynamic sectioning module 238 that generates dynamic sections for an electronic publication as a user consumes the electronic publication. Dynamic sectioning module 238 may generate a separate dynamic section for a passage or series of passages of an electronic publication that a user accesses that are non-contiguous with other passages that the user has accessed. For example, if the user reads passages 1-400, a first section that includes passages 1-400 may be generated. If the user then jumps to passage 500 and reads to passage 1000, a second section that includes passages 500-1000 may be generated.

Event detecting module 215 detects access events for electronic publications. Such access events may include opening an electronic publication, closing an electronic publication, presenting different passages (e.g., changing pages for an ebook), and so forth. For electronic print publications, some example access events include changing a font size, changing to a next or previous page, jumping to a selected page, passage or section, etc. For an electronic audio publication or electronic video publication, example access events may include rewind, fast forward, pause, etc. When an access event is detected, event detecting module 215 reports the access event to access behavior tracking module 210.

Access behavior tracking module 210 identifies specific passages that are presented by the user device at any given time. Access behavior tracking module 210 tracks a user's access behavior while the user consumes (e.g., reads, listens to, watches, etc.) an active electronic publication. Tracking a user's access behavior may include monitoring and recording a time stamp for each passage (e.g., based on accessing a clock included in the user device) indicating when the passage was accessed by the user (presented by the content access module 205) and a time stamp for each passage indicating when the content access module 205 stopped presenting the passage. This information may be used to identify a presentation duration for a passage or passages.

Tracking a user's access behavior may also include counting a number of times that the user accesses each passage. In one embodiment, access behavior tracking module 205 additionally records access information for dynamic and/or static sections. Thus, the access behavior tracking module 210 can track the amount of time that a specific passage and/or section is presented to a user, can track how many times a user accesses passages and/or sections, and can time stamp accesses to passages and/or sections of the electronic publication.

Access behavior tracking module 210 may record the user's access behavior data 250 in data store 240. The user access behavior data 250 may include information identifying a passage or passages of the electronic publication that were accessed, how long the passages were presented on the user device, how many times the passages have been presented on the user device, dates when the passages were accessed, a last passage or passages that were accessed, and so forth. The user access behavior data 250 may also include information identifying static and/or dynamic sections (e.g., the passages included in each of the sections), last passages of the sections that were accessed by the user, dates and times of when the sections were last accessed, etc.

In one embodiment, access behavior tracking module 210 computes a user's average reading speed and stores this information in the user access behavior data 250. The user's average reading speed may be used to determine whether a particular passage that was displayed to the user was actually read by the user. In one embodiment, a minimum display time threshold is set based on a standard deviation from the user's average reading speed (e.g., 2 standard deviations below the user's average reading speed). If the presentation time for a passage is below the minimum display time threshold, then access behavior tracking module 210 does not record the passage as having been presented to the user (or read by the user). For example, if the user's average reading speed is 1 page per minute, but the user issued a change page command after only 2 seconds, then access behavior tracking module 210 may determine that the passages that were displayed on the page were not read by the user. In one embodiment, dynamic sectioning module 238 uses this information to generate and/or identify different dynamic sections. For example, consider an instance in which the user issues a next page command twice rapidly while a first page is displayed, causing the passages in a second page to only be displayed for a few seconds before a third page is displayed. In this instance, the passages in the second page and third page will not be added to the dynamic section that includes the passages in the first page. Instead, a new dynamic section will be generated, and the passages in the third page will be added to the new dynamic section. The new dynamic section will start at the first passage on the third page.

In one embodiment, if a user reads (or otherwise accesses) the passages separating two dynamic sections (e.g., the user reads the passages in the second page from the above example), then the two dynamic sections will merge into a single dynamic section. Alternatively, the dynamic sections may remain as two separate dynamic sections, with the subsequent dynamic section having a starting point that corresponds to an endpoint of the previous dynamic section.

In one embodiment, the access behavior tracking module 210 includes a passive marking module 235. Passive marking module 235 automatically generates a passive marker 245 upon detection of predefined events and stores the passive marker 245 in data store 240. A passive marker 245 may include an address/identifier of a passage and a time stamp indicating when the marker 245 was generated. Additionally, the marker 245 may include contextual information about the passage and/or about a section that includes the passage. This may include chapter information, a page number, language from the passage and/or neighboring passages, etc. The marker 245 may also include an identifier of the user device that generated the marker 245, which may identify a device type of the user device. The passive marking module 235 may generate passive markers for one or more sections of the electronic publication. In one embodiment, the passive marking module 235 maintains a different marker for each dynamic section of the electronic publication. In one embodiment, each marker 245 includes an address/identifier of a first passage of an associated section in addition to the address/identifier of a last presented passage of the section. This information may be used to identify all of the passages included in the section.

In one embodiment, passive marking module 235 determines for a newly generated marker whether the new marker should overwrite any preexisting marker. If sectioning (e.g., dynamic sectioning) is implemented, then passive marking module 235 may determine whether there is a preexisting marker for a current section. If there is a preexisting marker, then passive marking module 235 may overwrite the preexisting marker with the new marker. If sectioning is not implemented, passive marking module 235 may determine whether any markers exist for a passage of a page that immediately precedes a current page (e.g., current page minus one). If a marker for the preceding page is found, then passive marking module 235 may overwrite that marker with the new marker.

In one embodiment, each passage is associated with an address within the electronic publication. Passive marking module 235 may examine the addresses of passages included in any preexisting markers. If an address of a passage associated with a preexisting marker is smaller than an address of the last passage of the current page and is within a threshold deviation from the address of the last passage of the current page, then passive marking module 235 determines that the preexisting marker is for a previous page. The threshold deviation may be set based on a number of passages that would fit on a single page (or alternatively based on the number of passages that would fit on two pages). For example, if 50 passages will fit on a page, and the last passage for the current page is 50, then any marker for a passage having an address of 1-49 may be replaced. In one embodiment, passive marking module 235 determines the number of passages that can fit on a single page based on a current font size. As the font size increases, fewer passages may fit on a single page.

In one embodiment, the passive marking module 235 automatically generates a marker 245 for a section when the user device stops presenting that section. Passive marking module 235 may generate a marker 245 in response to event detecting module 215 detecting an event that will cause a current section to end, will cause the electronic publication to close, will cause the user device to power down, and so on. Consider the example in which the user reads passages 1-100, and then issues a command to skip from passage 100 to passage 1000. Upon event detecting module 215 detecting this command, passive marking module 235 generates a marker 245 that marks passage 100 as the last passage of the dynamic section, and stores the marker 245 in the data store 240. Therefore, a user may later use the marker to return to passage 100 and continue where the user left off from the end of the section. Additionally, dynamic sectioning module 238 may generate a new dynamic section that begins at passage 1000. In one embodiment, the passage marker 245 is a component of a dynamic section 248 that identifies the last passage in the dynamic section 248. In one embodiment, the passage marking module 235 and dynamic sectioning module 238 are combined into a single module.

In one embodiment, access behavior tracking module 210 includes a passage ranking module 210. Passage ranking module 210 performs statistical analysis of the user access behavior data 250 to identify a user's favorite passages 255, and stores favorite passage data 255 identifying the favorite passages in data store 240. The favorite passage data 255 may include the contents of the favorite passage, a passage identifier/address, a total presentation time for the passage, an access count for the passage, a time stamp of a most recent access to the passage, etc. In one embodiment, passage ranking module 230 assigns a score to each passage based on a number of times that the passage has been accessed and the amount of time that the passage has been presented by the user device. The higher the access count for a passage and the longer the presentation time for the passage, the higher that passage's score.

In one embodiment, passages that have scores that meet or exceed a score threshold are identified as favorite passages. The score threshold may be a static predetermined threshold or may be a dynamic threshold that is computed based on the user's access behavior data 250. In another embodiment, passages that have the highest scores are identified as favorite passages (e.g., the passages having the highest score and the second highest score). In yet another embodiment, the passages having the highest score that are over a score threshold are identified as favorite passages.

In one embodiment, passage ranking module 230 filters the passages based on an access count threshold and/or a presentation time threshold. Therefore, passages that have been accessed fewer times than the access count threshold and/or for less time than the presentation time threshold are automatically disqualified as favorite passages. In one embodiment, the access count threshold and/or presentation time threshold are static thresholds with predetermined values. Alternatively, these thresholds may be dynamic thresholds computed based on the user's access behavior over multiple electronic publications. For example, if the user rarely rereads any material, then the access count threshold may be set to a low value such as 2 or 3. On the other hand, if the user frequently rereads material, then the access count threshold may have a higher value such as 7 or 8. Similarly, if the user is a very fast reader, then the presentation time threshold may be low (e.g., less than a minute).

In one embodiment, the user device includes one or more sensors such as touch sensors, proximity sensors and motion sensors (e.g., accelerometers, gyroscopes, etc.) that the user device can use to identify whether the user device is being held by a user. For example, if an accelerometer detects constant or occasional motions and/or a proximity sensor detects a conductive object, then access behavior tracking module 210 may determine that a user is holding the user device (and thus is likely reading or otherwise consuming presented passages). In one embodiment, if the access behavior tracking module 210 determines that a user is taking an uncharacteristically long time reading through a passage of text, access behavior tracking module 210 checks data from one or more sensors to determine whether the user device is being held by a user. If the user device is not being held by a user and no page turn signal or other access command has been sent to the user device for a threshold period of time, the access behavior tracking module 210 may determine that the user is not currently reviewing the current passage, and record a current time stamp. The access behavior tracking module 210 may alternatively deduct time from the current time and record a time stamp with the adjusted time. This may reduce a likelihood that passages on a last page that a user was reading are incorrectly assigned a high presentation time or classified as favorite passages.

In one embodiment, the user device includes an optical sensor that tracks user eye movement. Access behavior tracking module 210 may then correlate the user eye movement to currently displayed passages of text. This information may be used to more accurately identify how a user is progressing through particular passages, whether a user is nodding off (e.g., if eyes are detected to be closed or droopy), or whether a user is not looking at the user device. Thus, the optical sensor can provide additional information on a user's access behavior. This additional information may be included in the user access behavior data 250.

Publication loading module 225 loads electronic publications for presentation by content access module 205. When a publication is loaded, publication loading module determines whether there are any markers 245 associated with the publication. If there are markers 245 associated with the publication, publication loading module 225 presents the markers to a user for user selection. The markers 245 may be presented along with contextual information about the passages and/or sections identified by the markers. Once the user selects a marker, publication loading module 225 opens the electronic publication to the passage indicated by the selected marker.

In one embodiment, publication loading module 225 presents a list of favorite passages in response to receiving a command to view favorite passages. Publication loading module 225 may then receive selection of a favorite passage, and may open the electronic publication to the selected favorite passage.

Server interaction module 220 reports the user's access behavior (e.g., user access behavior data 250), the user's markers 245 and/or the user's favorite passages 255 to a content server. The content server may then aggregate this information with access behavior data from other users. Additionally, the content server may share the user's favorite passages and/or markers with other users. In one embodiment, favorite passages and/or markers are shared in response to receiving a share request from the user. In one embodiment, the sharing includes accessing a social network account (e.g., a Facebook® account, a MySpace® account, a GoodReads® account, etc.) for the user and posting the favorite passages and/or markers to the social network account.

In one embodiment, server interaction module 220 receives user access behavior data 250, markers 245 and/or favorite passages 255 from the content server. The received information may be based on user consumption of the electronic publication on a different user device. Alternatively, the received information may be markers provided by a different user that identify passages and/or sections that the other user recommends. For example, the other user may be a professor of a class, and the markers may mark assigned reading for the user. The received information may include markers 245 and/or dynamic sections 248 generated by another user device. If the received markers 245 and/or dynamic sections 248 have more recent time stamps than stored markers 245 and/or dynamic sections 248, then the received markers 245 and dynamic sections 248 may overwrite the stored markers 245 and dynamic sections 248 generated by content access module 205. This may synchronize multiple user devices belonging to the user.

Passage ranking module 230 may use both received user access behavior data and locally generated user access behavior data to score passages and identify favorite passages. In one embodiment, user access behavior data 250 includes information identifying a type of device and/or a specific device on which access events occurred. Therefore, passage ranking module 230 may determine general favorite passages as well as favorite passages based on user device type. For example, passage ranking module 230 may determine that particular passages of an electronic publication are a user's favorite when viewing from a tablet computer, and other passages are the user's favorite when viewing from an electronic book reader.

Figure 3:
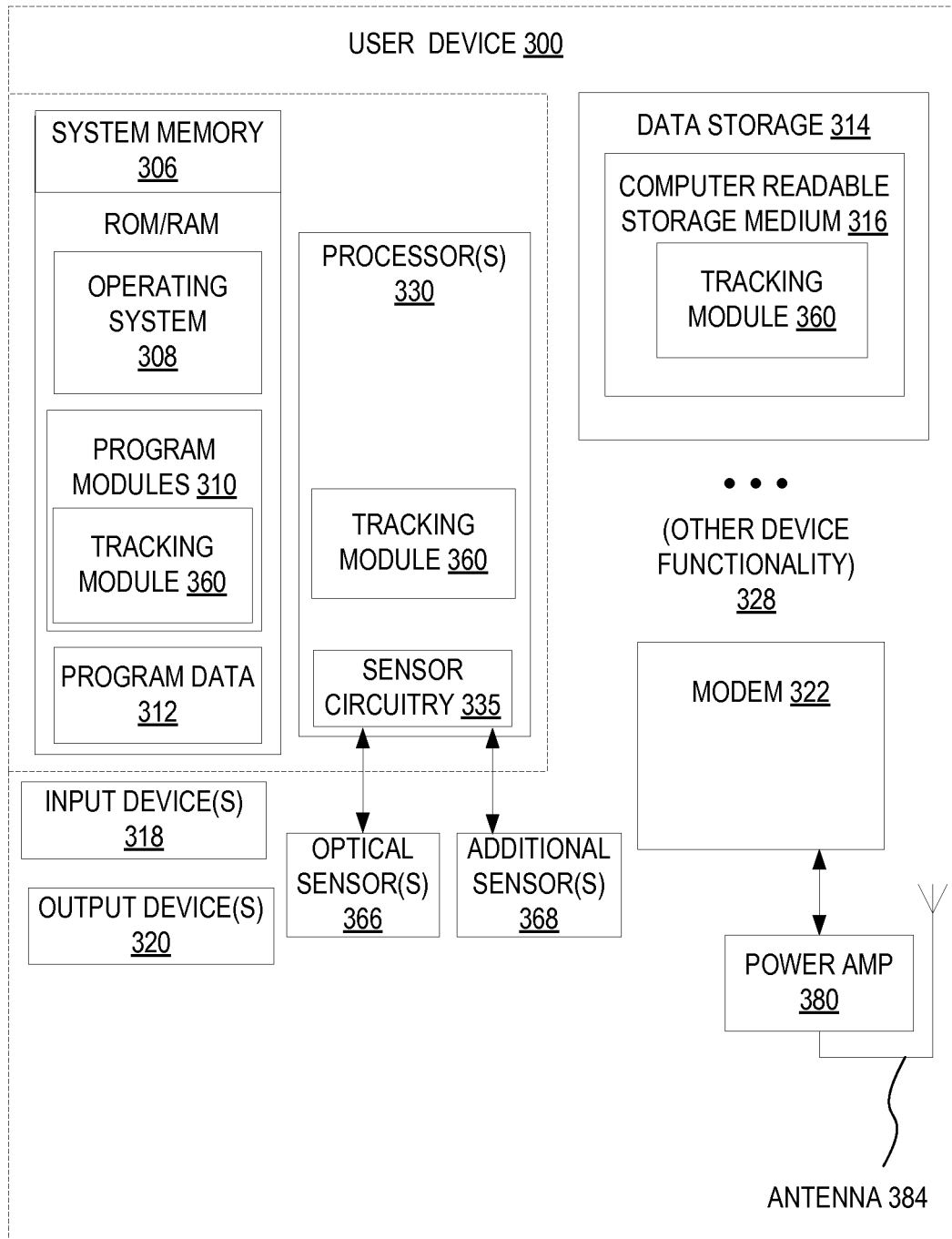
FIG. 3 is a block diagram illustrating an exemplary user device, in accordance with one embodiment of the present invention.

FIG. 3 is a block diagram illustrating an exemplary user device 300. The user device 300 may correspond to the user device 104 of FIG. 1 and may be any type of user device such as an electronic book reader, a PDA, a mobile phone, a laptop computer, a portable media player, a tablet computer, an electronic pad, a desktop computer, a camera, a video camera, a netbook, and the like.

The user device 300 includes one or more processors 330, such as one or more CPUs, microcontrollers, field programmable gate arrays, or other types of processors. The user device 300 also includes system memory 306, which may correspond to any combination of volatile and/or non-volatile storage mechanisms. The system memory 306 stores information which provides an operating system component 308, various program modules 310 such as an access behavior tracking module ("tracking module") 360 and/or other components. The user device 300 performs functions by using the processor(s) 330 to execute instructions provided by the system memory 306.

The user device 300 also includes a data storage device 314 that may be composed of one or more types of removable storage and/or one or more types of non-removable storage. The data storage device 314 includes a computer-readable storage medium 316 on which is stored one or more sets of instructions embodying any one or more of the methodologies or functions described herein. As shown, instructions for the tracking module 360 may reside, completely or at least partially, within the computer readable storage medium 316, system memory 306 and/or within the processor(s) 330 during execution thereof by the user device 300, the system memory 306 and the processor(s) 330 also constituting computer-readable media. In one embodiment, data storage 314 includes data store 240 of FIG. 2. The user device 300 may also include one or more input devices 318 (keyboard, mouse device, specialized selection keys, etc.) and one or more output devices 320 (displays, printers, audio output mechanisms, etc.).

The user device 300 further includes a wireless modem 322 to allow the user device 300 to communicate via a wireless network (e.g., such as provided by the wireless communication system) with other computing devices, such as remote computers, the content providing system, online book stores, electronic catalogs for libraries, and so forth. The wireless modem 322 may allow the user device 300 to handle both voice and non-voice communications (such as communications for text messages, multimedia messages, media downloads, web browsing, etc.) with the wireless communication system 110. The wireless modem 322 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1xRTT), evaluation data optimized (EVDO), high-speed downlink packet access (HSDPA), WiFi, etc. The wireless modem 322 may generate signals and send these signals to power amplifier (amp) 380 for amplification, after which they are wirelessly transmitted via antenna 384. In addition to sending data, antenna 384 also receives data, which is sent to wireless modem 322 and transferred to processor(s) 330.

In one embodiment, user device 300 includes an optical sensor 366. The optical sensor 366 may be a low resolution camera (e.g., having 0.2 or 0.3 Megapixels) that takes images (e.g., of a user's eyes) on a periodic basis. Alternatively, the optical sensor 366 may have a higher resolution, such as 1 Megapixel up to 10 or more Megapixels. The optical sensor 366 may be positioned such that images are taken of a user's face while the user holds the user device 300 in front of his face in a standard reading position. Therefore, the optical sensor 366 may be used to track user eye movement during reading.

In one embodiment, user device 300 includes one or more additional sensors 368 such as a physical contact sensor, close proximity sensors, or motion sensors. The sensors 368 can detect the presence of human body parts, and convey information regarding the detected presence to processor(s) 330. In one embodiment, the sensors 368 may be capacitive sensors that are configured to measure capacitance generated by the presence of the human body part using any one of various techniques known in the art, for example, relaxation oscillation, a current verses voltage phase shift comparison, resistor-capacitor charge timing, capacitive bridge division, charge transfer, sigma-delta modulation, or charge-accumulation. In an alternative embodiment, the sensors 368 may also be optical (e.g., infrared) sensors that use an emitter and receiver pair to detect the presence of opaque objects. Alternatively, the sensors 368 may be inductive sensors, which include an inductive loop. When the presence of a human body part (or metal object) is brought close to the inductive sensor, an induction of the inductive loop changes, causing the human body part to be detected. Alternatively, the sensors 368 may be ultrasonic sensors that emit an ultrasonic signal and measure a time duration between when a signal is transmitted and the reflection of that signal received (a.k.a., flight response). The sensors 368 may also include other types of sensors, such as those that operate using the detection principles of resistive (e.g., analog resistive, digital resistive or residual resistive), surface acoustic wave, electromagnetic, near field imaging, or other technologies. In one embodiment, multiple different types of sensors are used. Though the detected object is described herein as a human body part, other types of objects may also be detected depending on the sensing technologies used.

In one embodiment, the additional sensors 368 include a motion sensor, such as an accelerometer or gyroscopes. The user device 300 may use motion data from motion sensors to determine whether a user is holding the user device 300. For example, if the user device 300 experiences constant minor accelerations, it may be determined that the user device 300 is being held in a user's hand. Additionally, if the user device 300 is at a particular angle (detectable based on acceleration readings from an accelerometer), it may be determined that the user device 300 is being rested on a user's leg during reading.

The processor(s) 330 may include sensor circuitry 335 (e.g., sensor device drivers) that enables the processor(s) 330 to interpret signals received from the optical sensor(s) 366 and/or additional sensors 368. In one embodiment, the optical sensors 366 and/or additional sensors 368 output raw sensor data. In another embodiment, the optical sensors 366 and/or additional sensors 368 output fully processed signals to the processor(s) 330. For example, the additional sensors 368 may output a user contact/no user contact signal using a single line interface or a multi-line interface. In another embodiment, the additional sensors 368 output, for example, positional data and/or object presence data (e.g., of a human body part) to the processors 330 without first processing the data. In either instance, the processors 330 may use the sensor circuitry 335 to process and/or interpret the received data. If data is received from multiple sensors, processing the data may include averaging the data, identifying a maximum from the data, or otherwise combining the data from the multiple sensors.

Figure 4:
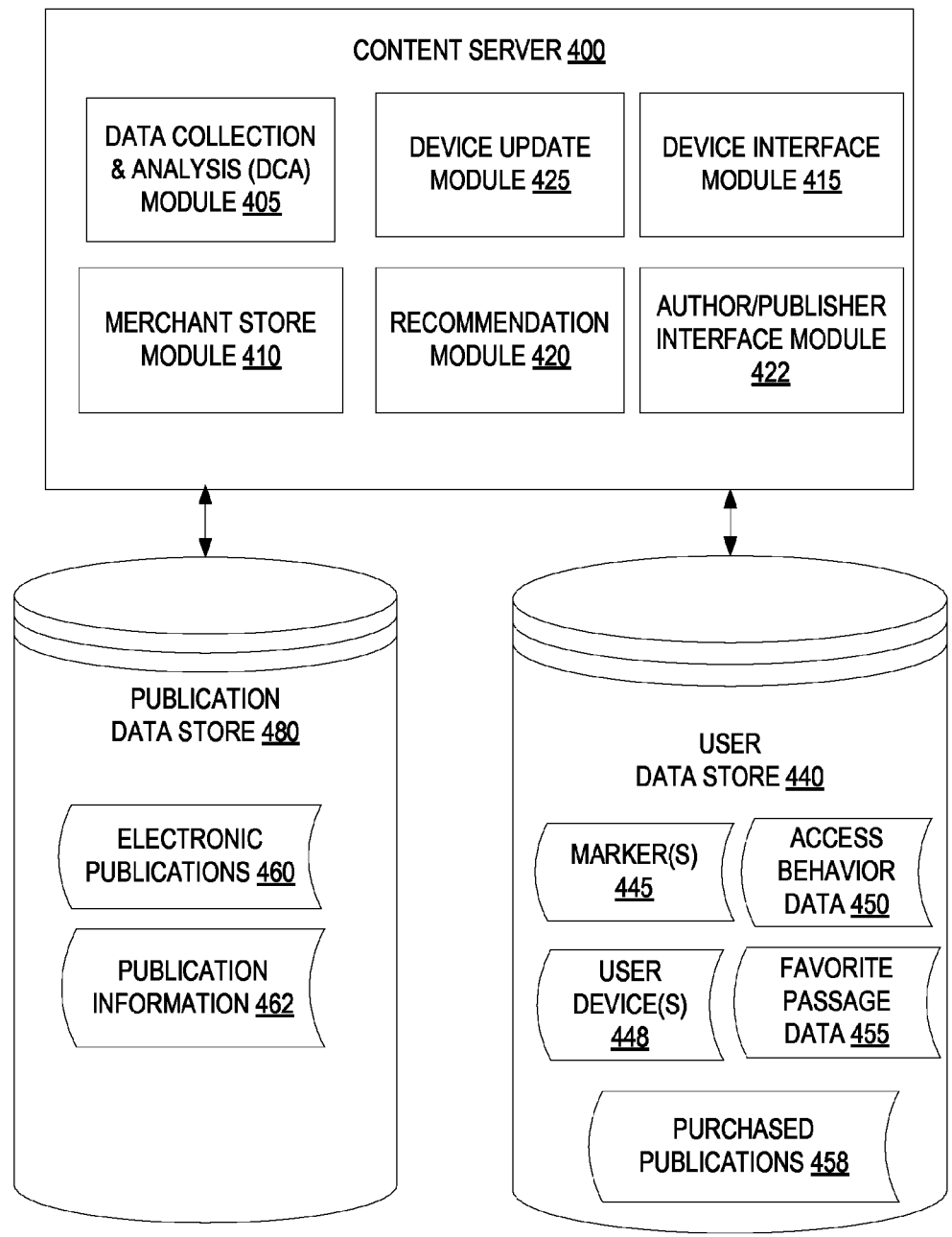
FIG. 4 is a block diagram illustrating one embodiment of a content server.

FIG. 4 is a block diagram of one embodiment of a content server 400, which may correspond to the content server 125 of FIG. 1. User devices may access the content server 400 via a network. In one embodiment, the content server 400 includes a data collection and analysis (DCA) module 405, a merchant store module 410, a device update module 425, a recommendation module 420 and a device interface module 415.

In one embodiment, content server 400 is connected to a publication data store 480 and a user data store 440. Publication data store 480 includes electronic publications 460 and information about electronic publications 462. Publication information 462 may include identification information (e.g., title, identification number, invariant reference number, etc.), available formats (such as whether the content item is available as a book, audio, video, executable program, etc.), genre of electronic publication (such as mystery, science fiction, biography, horror, reference, game, utility, etc.), related works (such as music tracks found in the same album, books in a series, movies by the same director, etc.), sales data (such as historical sales data, quantities sold/licensed, profit margin, returns, etc.), bibliographic data (such as author, artist, publisher, edition, length, catalog number, etc.), and so forth. Publication information 462 may also include favorite passages of one or multiple users. In one embodiment, favorite passage data identifies the number of users for which passages are favorite passages.

User data store 440 includes information about specific users. For each user, the user data store 440 may include information such as markers 445, access behavior data 450, user devices 448, favorite passages 455, purchased publications, 458, etc. Access behavior data 450 may include an electronic publication identification, information pertaining to an elapsed time since last access, total access time of the electronic publication by the user, an access duration for each passage of the electronic publication, an access count for each passage of the publication, a frequency of access for the publication, annotation information, such as annotations made by users, etc.

Device interface module 415 interfaces with content access modules running on user devices. The device interface module 415 may receive requests to perform actions from user devices, such as requests to browse available electronic publications, to retrieve additional information about publications, to purchase publications, to check out publications (e.g., from a library), to reserve publications, to place publications in a wish list, and so on. Device interface module 415 may receive search queries from user devices and provide search results and other information to user devices. Device interface module 415 may also perform the transfer of content such as electronic publications, software updates, etc. to user devices. For example, after a user has searched for a publication, received search results including an electronic version of that publication that is available in data store 440, and purchased the electronic version of the publication from merchant store module 410, device interface module 415 may download the electronic version of the publication to the user device.

In one embodiment, device update module 425 maintains an update queue (not shown) for user devices of a user. Entries in the update queue may include software updates, recently purchased publications, access behavior data, favorite passage data, markers, etc. Device interface module 415 may send updates to specified user devices based on entries in the update queue. Therefore, device update module 425 may maintain synchronization between multiple user devices belonging to a user.

The DCA module 405 collects data pertaining to user interaction with electronic publications, which is generally referred to as access behavior data 450. The DCA module 405 then processes the access behavior data 450 to determine favorite passages of users. The DCA module 405 may perform statistical analysis to determine passages that are favorite passages of multiple users. In one embodiment, performing statistical analysis to determine favorite passages includes determining favorite passages for each user as described above, and then determining universal favorite passages based on the individual favorite passages of users. Alternatively, user devices may report favorite passages of particular users, and DCA module 405 may aggregate this data to identify universal favorite passages. The universal favorite passages may be those favorite passages that were favorites for the most users. The DCA module 405 may determine favorite passages for specific groups of users (e.g., favorite passages for users in a particular age range). The DCA module 405 may also determine favorite passages based on device type. For example, DCA module 405 may determine favorite passages for ebook readers, for tablet computers, for mobile phones, etc.

In one embodiment, the DCA module 405 relates users based on their favorite passages. Therefore, relations may be generated between users who share the same favorite passages for one or more electronic publications. These relations may be used by recommendation module 420 to recommend electronic publications.

The merchant store module 410 enables a user to purchase electronic publications from the content server 400. The merchant store module 410 presents to user devices publication information 462. The publication information 462 may be presented for the user device in the format of a searchable catalog of electronic publications 460. The publication information may include descriptions and other information of various electronic publications 460 that may be selected using the merchant store module 410. The publication information may include, for example, excerpts of the electronic publication based on favorite passages of users. The favorite passages may be those passages that are favorite passages for many users. Alternatively, the favorite passages may be favorite passages of other users that have been related to the current user by the DCA module 205. The merchant store module 410 includes functionality allowing a user to search and browse though the selection of electronic publications 460 in publication data store 480. The merchant store module 410 may also include functionality allowing a user to purchase publications (or, more generally, acquire publications based on any terms). A user may interact with the merchant store module 410 via the device interface module 415.

Recommendation module 420 generates recommendations of electronic publications for users based on their access behavior data 450 and/or their favorite passages 455. The recommendations may be generated for a particular user, or for a group of users. In one embodiment, recommendation module 420 uses the relations determined by DCA module 205 to find for a particular user other users who share the same favorite passages as the particular user. Recommendation module 420 then identifies other favorite passages of those other users for publications not consumed by the particular user, and generates recommendations for the particular user based on those other favorite passages. Recommendation module 420 may recommend the electronic publications that those other favorite passages are excerpts from. In addition to using similar behavior of other users, recommendations may be based on other techniques, such as item-to-item similarity mappings, various clustering techniques, viewing histories, purchase histories, and so forth. For instance, the user may also receive recommendations based on content items that have previously been purchased.

In one embodiment, content server 400 includes an author/publisher interface module 422. Author/publisher interface module 422 reports users' favorite passages and/or universal favorite passages to publishers and/or authors of electronic publications. In one embodiment, author/publisher interface module 422 anonymizes the favorite passage information before sending it to the authors and/or publishers.

Figure 5:
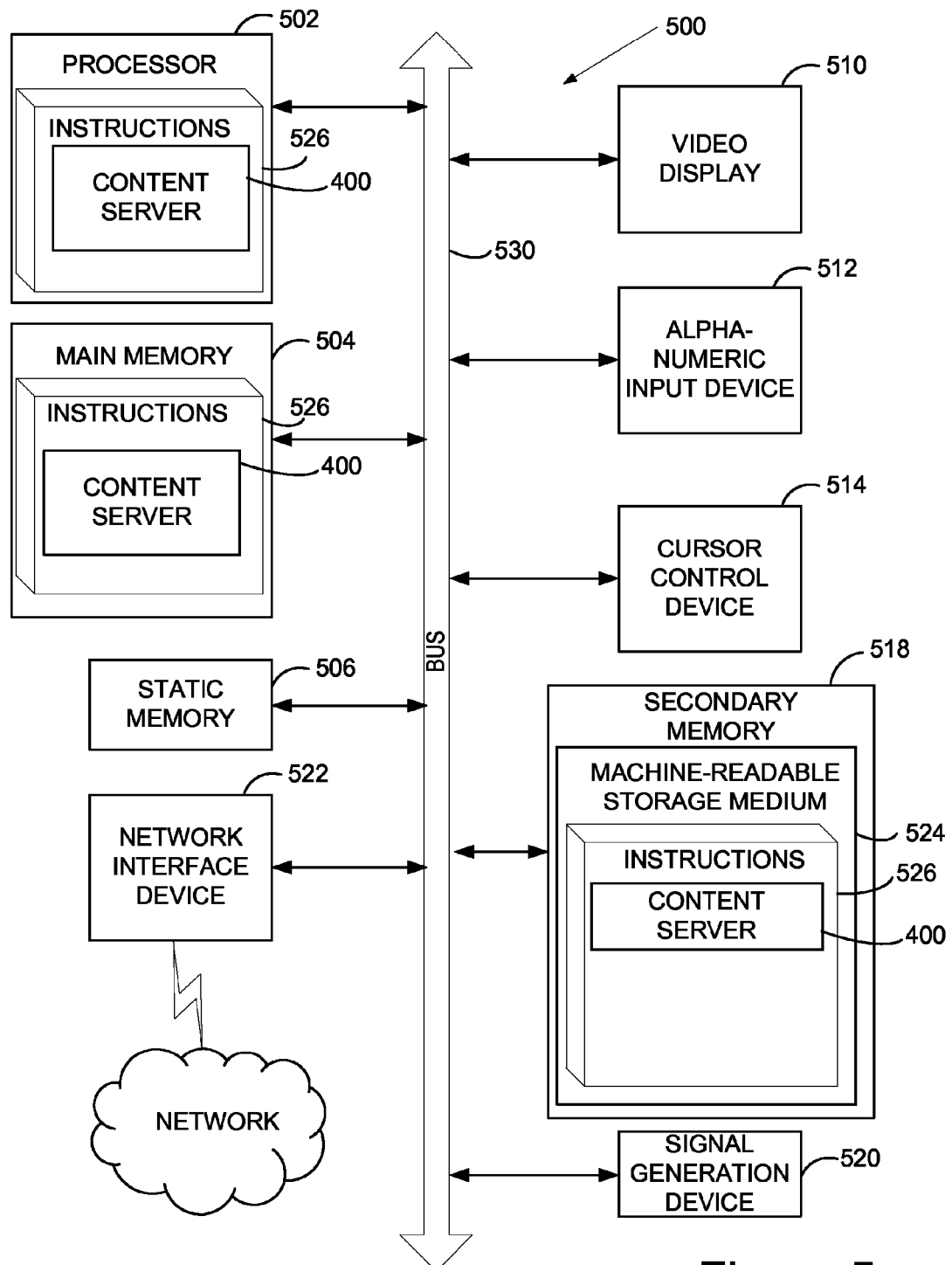
FIG. 5 is a block diagram illustrating an exemplary server computing device, in accordance with one embodiment of the present invention.

FIG. 5 is a block diagram illustrating an exemplary server computing device 500. In one embodiment, the server computing device corresponds to content providing system 125 of FIG. 1. The server computing device 500 includes a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary server computing device 500 includes a processing system (processor) 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the content server 400 for performing the operations and steps discussed herein.

The server computing device 500 may further include a network interface device 522. The server computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The secondary memory 518 may include a computer-readable medium 524 on which is stored one or more sets of instructions 526 (e.g., instructions of content sever 400) embodying any one or more of the methodologies or functions described herein. The content server 400 may also reside, completely or at least partially, within the main memory 504 and/or within the processor 502 during execution thereof by the computer system 500, the main memory 504 and the processor 502 also constituting computer-readable media.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Figure 6:
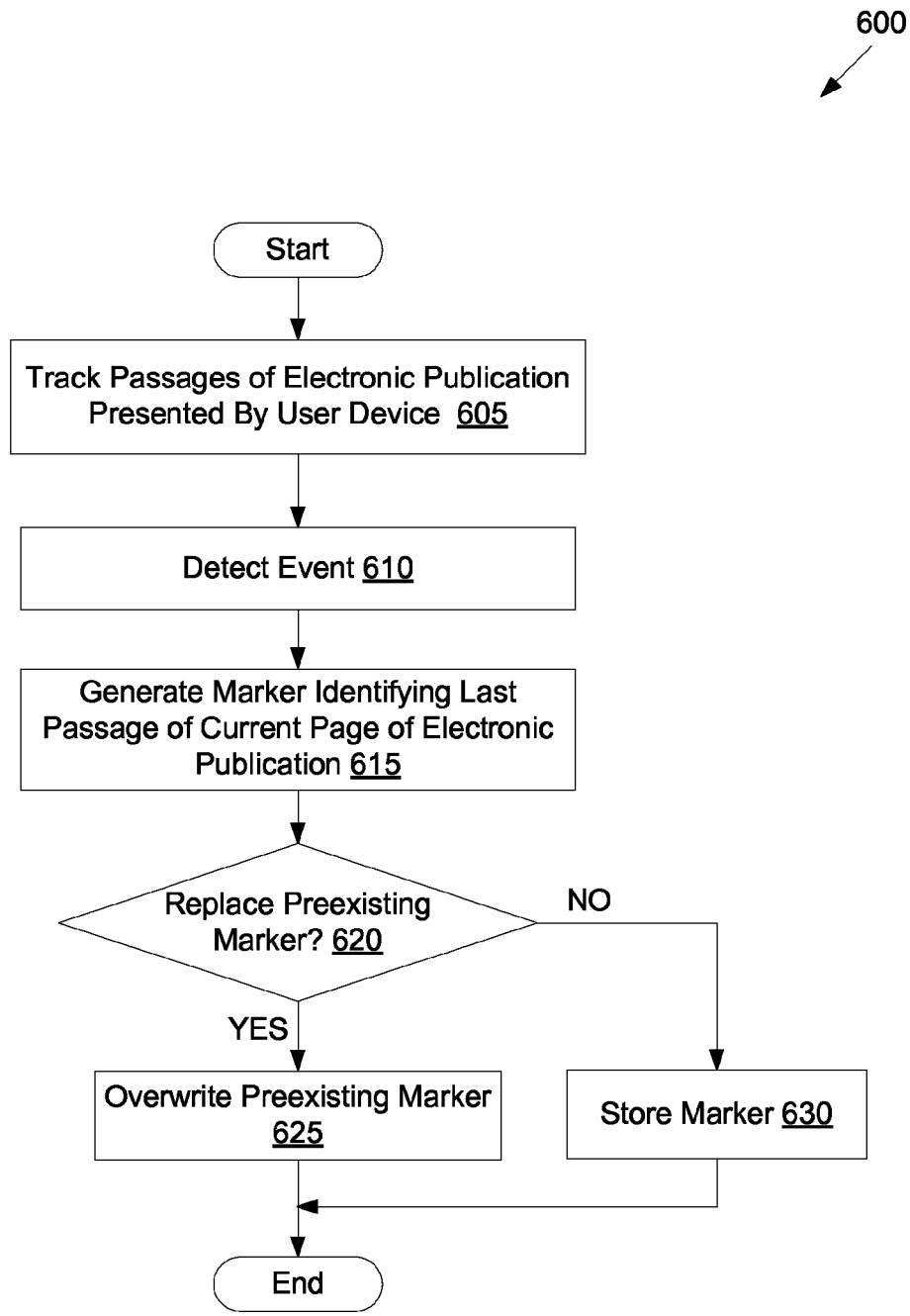
FIG. 6 is a flow diagram of one embodiment for a method of tracking passages of an electronic publication and automatically generating markers.

FIG. 6 is a flow diagram of one embodiment for a method 600 of tracking passages of an electronic publication and automatically generating markers. The method is performed by processing logic that may comprise hardware (circuitry, dedicated logic, etc.), software (such as is run on a general purpose computer system or a dedicated machine), or a combination of both. In one embodiment, method 600 is performed by a user device or by a component of a user device. For example, method 600 may be performed by an access behavior tracking module 140 of user device 104 of FIG. 1. In one embodiment, processing logic includes one or more hardware or software modules, such as the modules of content access module 205 of FIG. 2.

Referring to FIG. 6, at block 605 of method 600 processing logic tracks passages of an electronic publication presented by a user device. Tracking the passages includes tracking a last passage presented by the user device (e.g., the last passage of a last page presented by the user device). Tracking the passages displayed by the user device may include determining how much time the user spends reading passages of the publication, maintaining access counts for the passages, and so on.

At block 610, processing logic detects an access event. Examples of access events include commands to close a content access module, commands to close an electronic publication, commands to power down a user device, commands to present new passages on the user device (e.g., to present a next page or to skip to a designated page), the user device presenting a new page, and so on. At block 615, processing logic generates a marker identifying a last passage of a current page of the electronic publication.

At block 620, processing logic determines whether to replace a preexisting marker with the generated marker. In one embodiment, processing logic determines to replace a preexisting marker if processing logic identifies a preexisting marker for a passage associated with a preceding page. For example, if the current marker is for a passage on page 9, and there is a preexisting marker for a passage on page 8, then the preexisting marker will be replaced. If processing logic determines to replace a preexisting marker, the method continues to block 625, and processing logic overwrites the preexisting marker. Otherwise, the method proceeds to block 630 and processing logic stores the marker without overwriting any preexisting markers.

Figure 7:
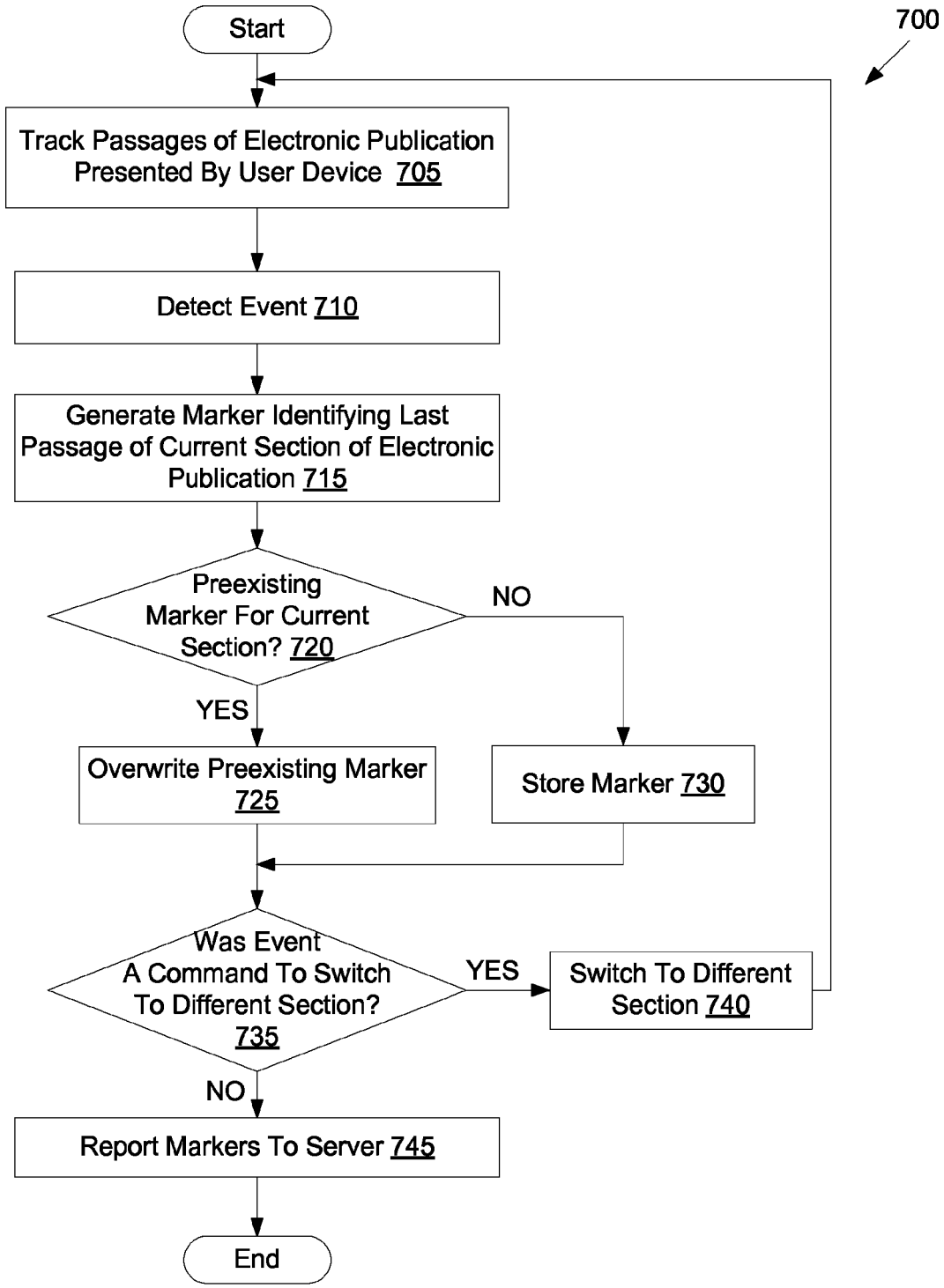
FIG. 7 is a flow diagram of another embodiment for a method of tracking passages of an electronic publication and automatically generating markers.

FIG. 7 is a flow diagram of another embodiment for a method 700 of tracking passages of an electronic publication and automatically generating markers. The method is performed by processing logic that may comprise hardware (circuitry, dedicated logic, etc.), software (such as is run on a general purpose computer system or a dedicated machine), or a combination of both. In one embodiment, method 700 is performed by a user device or by a component of a user device. For example, method 700 may be performed by an access behavior tracking module 140 of user device 104 of FIG. 1. In one embodiment, processing logic includes one or more hardware or software modules, such as the modules of content access module 205 of FIG. 2.

Referring to FIG. 7, at block 705 of method 700 processing logic tracks passages of an electronic publication presented by a user device. Tracking the passages includes tracking a last passage presented by the user device (e.g., the last passage of a last page presented by the user device). Tracking the passages displayed by the user device may include determining how much time the user spends reading passages of the publication, maintaining access counts for the passages, and so on.

At block 710, processing logic detects an access event. Examples of access events include commands to close a content access module, commands to close an electronic publication, commands to power down a user device, and commands to present new passages on the user device (e.g., to present a next page or to skip to a designated page). At block 715, processing logic generates a marker identifying a last passage of a current section of the electronic publication. The section may include the passages in a current page, or may include passages spanning multiple pages. At block 720, processing logic determines whether there is a preexisting marker for the current section. If there is a preexisting marker for the current section, the method continues to block 725 and processing logic overwrites the preexisting marker with the recently generated marker. Otherwise, the method continues to block 730 and processing logic stores the marker.

At block 735, processing logic determines whether the event was a command to switch to a different section (e.g., to a passage that is non-contiguous with any passage of a current section). If the command was a command to switch to a different section, the method proceeds to block 740. Otherwise, processing logic continues to block 745, and the marker may be reported to a content server.

At block 740, processing logic switches to a passage in a different section. If no section has yet been generated for the passage that the processing logic switches to, then processing logic dynamically generates a new section. The method then returns to block 705.

Figure 8:
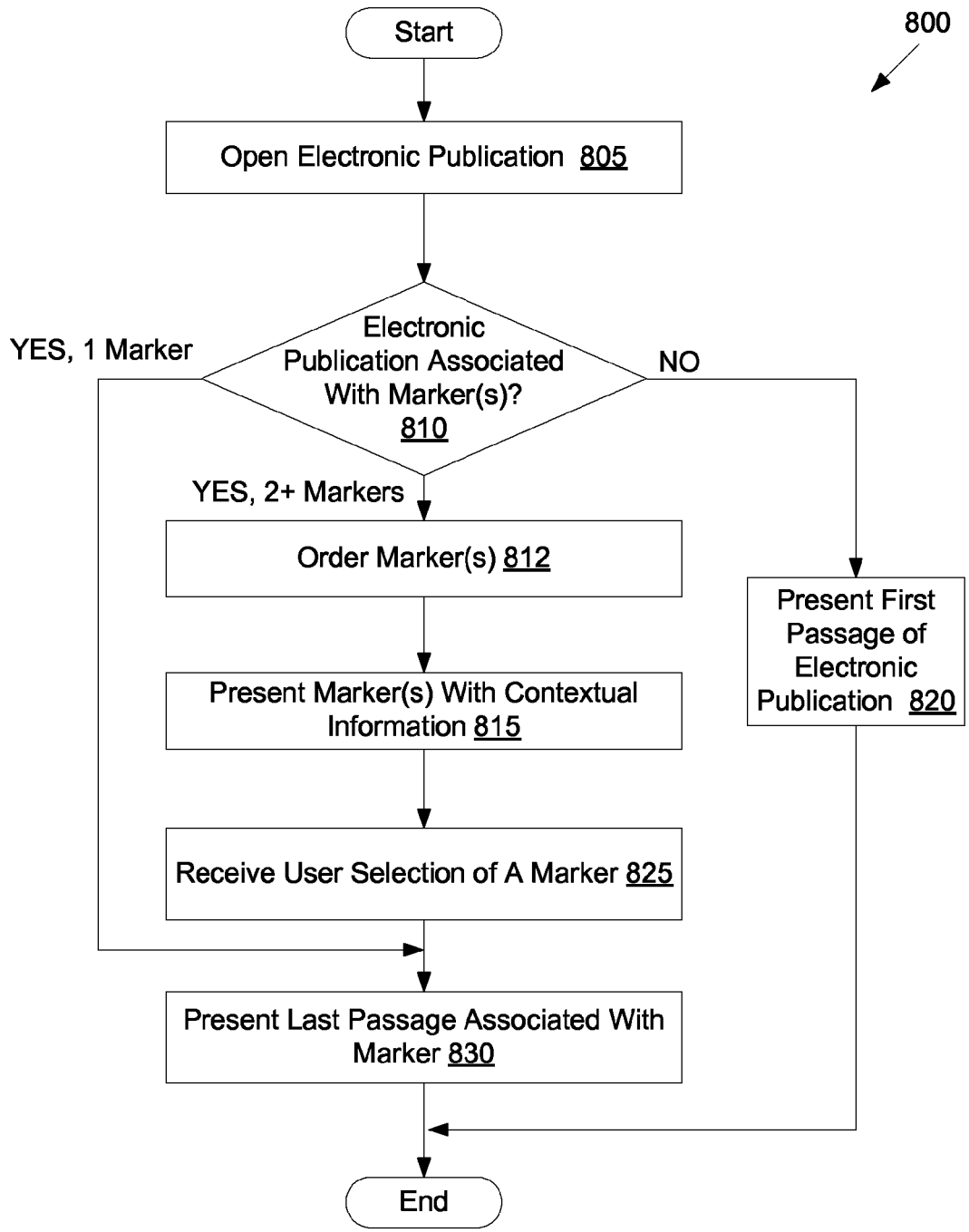
FIG. 8 is a flow diagram of one embodiment for a method of opening an electronic publication to a marked passage.

FIG. 8 is a flow diagram of one embodiment for a method 800 of opening an electronic publication to a marked passage. The method is performed by processing logic that may comprise hardware (circuitry, dedicated logic, etc.), software (such as is run on a general purpose computer system or a dedicated machine), or a combination of both. In one embodiment, method 800 is performed by a user device or by a component of a user device. For example, method 800 may be performed by an access behavior tracking module 140 of user device 104 of FIG. 1. In one embodiment, processing logic includes one or more hardware or software modules, such as the modules of content access module 205 of FIG. 2.

Referring to FIG. 8, at block 805 of method 800 processing logic opens an electronic publication. At block 810, processing logic determines whether the electronic publication is associated with any markers. If the electronic publication is not associated with any markers, the method continues to block 820. If the electronic publication is associated with a single marker, the method proceeds to block 830. If the electronic publication is associated with multiple markers, the method continues to block 812.

If the electronic publication is not associated with any markers, then the electronic publication has not yet been read by a user. Accordingly, at block 820, processing logic presents a first passage of the electronic publication on the user device.

At block 812, processing logic orders the markers. In one embodiment, the markers are ordered chronologically. Therefore, the marker that was generated the most recently will occur first in the order, and the oldest marker will occur last in the order. Alternatively, the markers may be ordered based on position in the electronic publication. For example, a marker having a passage with address 1000 will be ordered before a marker having a passage with address 2000.

At block 815, processing logic presents the markers in the determined order with contextual information. The contextual information displayed with the markers may include a chapter number and title, the contents of the passage and/or neighbor passages (e.g., a sentence or paragraph), a date indicating when the marker was generated, and so on. At block 825, processing logic receives a user selection of a marker. At block 830, processing logic presents the passage associated with the marker. The passage may be the last passage of a section (e.g., of a dynamic section). The method then ends.

Figure 9:
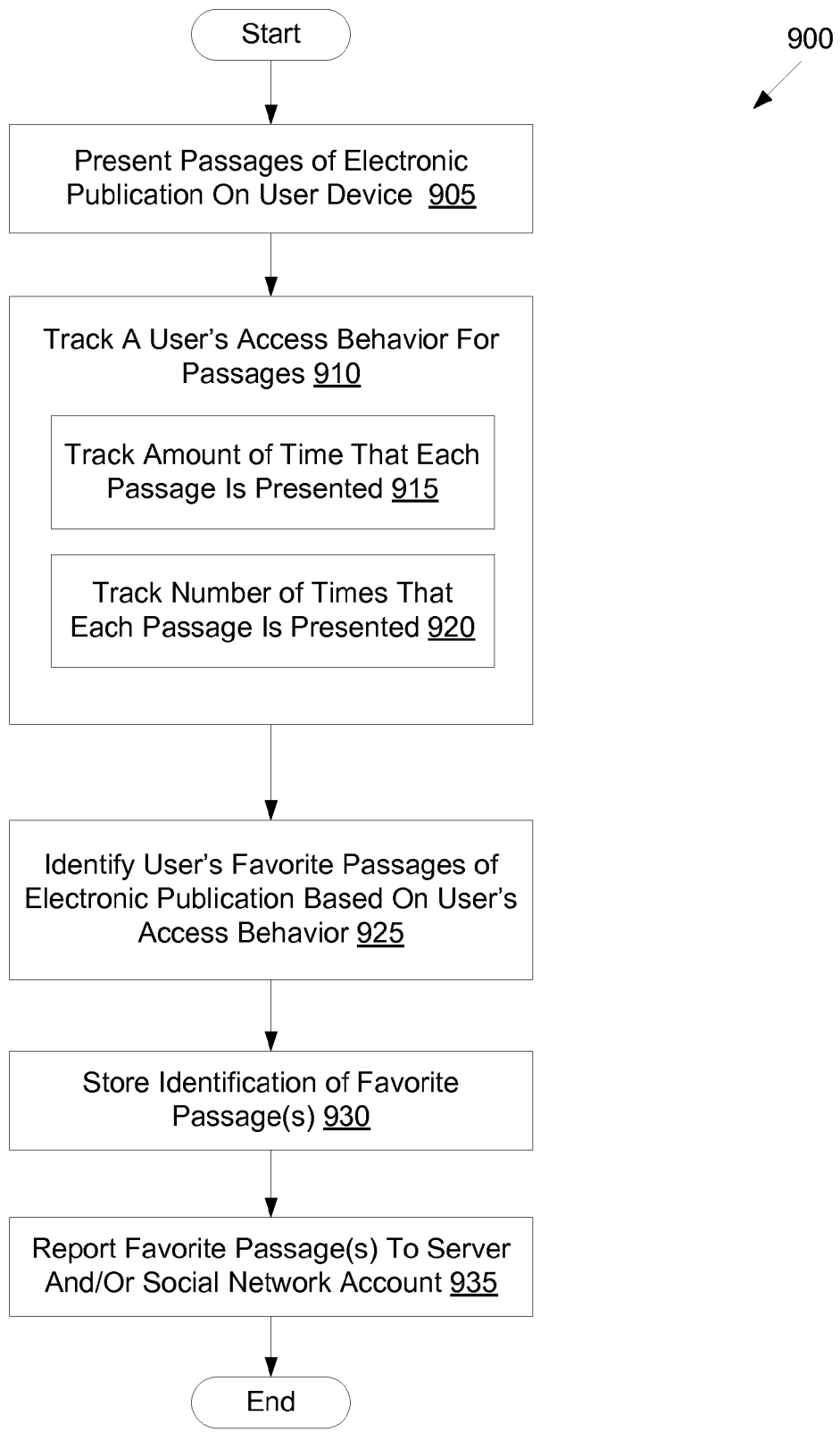
FIG. 9 is a flow diagram of one embodiment for a method of identifying a user's favorite passages.

FIG. 9 is a flow diagram of one embodiment for a method 900 of identifying a user's favorite passages. The method is performed by processing logic that may comprise hardware (circuitry, dedicated logic, etc.), software (such as is run on a general purpose computer system or a dedicated machine), or a combination of both. In one embodiment, method 900 is performed by a user device or by a component of a user device. For example, method 900 may be performed by an access behavior tracking module 140 of user device 104 of FIG. 1. In one embodiment, processing logic includes one or more hardware or software modules, such as the modules of content access module 205 of FIG. 2.

Referring to FIG. 9, at block 905 of method 900 processing logic presents passages of an electronic publication on a user device. At block 910, processing logic tracks a user's access behavior for the presented passages. In one embodiment, this includes tracking an amount of time that each passage is presented (block 915) and tracking a number of times that each passage is presented (block 920).

At block 925, processing logic identifies a user's favorite passages of the electronic publication based on the user's access behavior. This may include performing statistical analysis of the user's access behavior. One embodiment for identifying a user's favorite passages is performed by method 900, which is described below. At block 930, processing logic stores the identification of the favorite passages. At block 935, processing logic reports the favorite passages to a content server. Additionally, processing logic may report the favorite passages to a social network account of the user. Therefore, the user may share his favorite passages with friends on his or her social network account.

Figure 10:
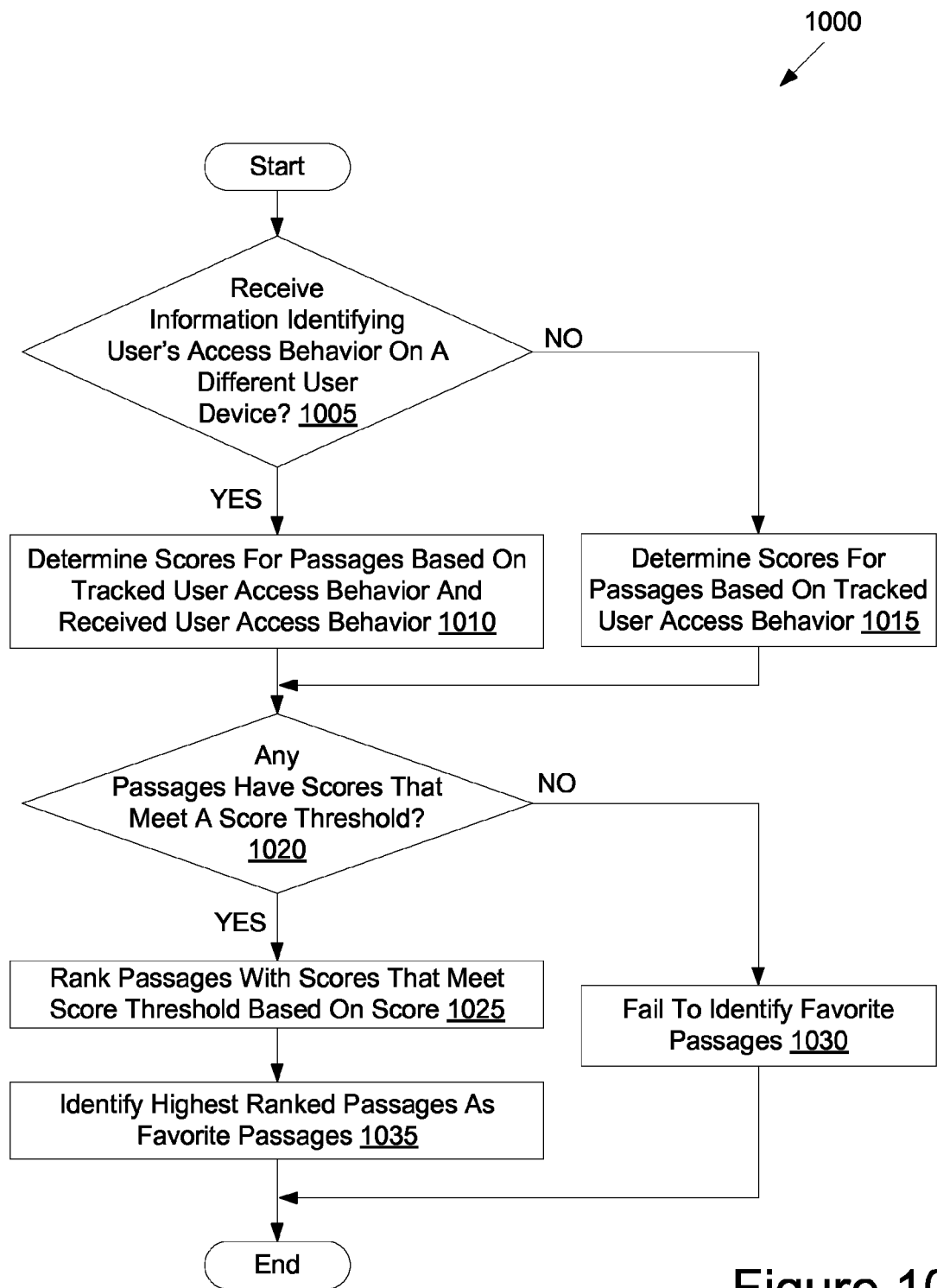
FIG. 10 is a flow diagram of another embodiment for a method of identifying a user's favorite passages.

FIG. 10 is a flow diagram of another embodiment for a method 1000 of identifying a user's favorite passages. The method is performed by processing logic that may comprise hardware (circuitry, dedicated logic, etc.), software (such as is run on a general purpose computer system or a dedicated machine), or a combination of both. In one embodiment, method 1000 is performed by a user device or by a component of a user device. For example, method 1000 may be performed by an access behavior tracking module 140 of user device 104 of FIG. 1. In one embodiment, processing logic includes one or more hardware or software modules, such as the modules of content access module 205 of FIG. 2. In one embodiment, method 1000 corresponds to block 925 of method 900.

Referring to FIG. 10, at block 1005 of method 1000 processing logic determines whether information identifying a user's access behavior on a different user device has been received. If such information has been received, the method proceeds to block 1010. Otherwise, the method continues to block 1015.

At block 1010, processing logic assigns scores to passages based on locally tracked access behavior and on received user access behavior. In one embodiment, processing logic determines scores for passages based on an amount of time that the passage was presented by user devices of the user and the number of times that the passage was presented by the user devices. Processing logic may also use information from one or more sensors that was gathered while the passages were presented to determine if the user device was held while the passages were presented. For example, data from a motion sensor and/or proximity sensor may be used to determine if the user was holding the user device while the passages were presented. In one embodiment, processing logic adjusts a passage's score downward if processing logic determines that the user device was not held while the passage was presented. At block 1015, processing logic assigns scores to passages based on tracked access behavior of a single user device At block 1020, processing logic determines whether any passages have scores that meet or exceed a score threshold. If one or more passages have scores that meet the score threshold, the method continues to block 1025. Otherwise, the method proceeds to block 1030 and processing logic fails to identify any favorite passages.

At block 1025, processing logic ranks passages based on their scores. At block 1035, processing logic identifies passages having the highest ranks as the user's favorite passages. In one embodiment, user access behavior data includes an identifier of a type of device that collected the user access behavior data. Accordingly, processing logic may separately determine favorite passages per device type in addition to overall favorite passages of a user.

Figure 11:
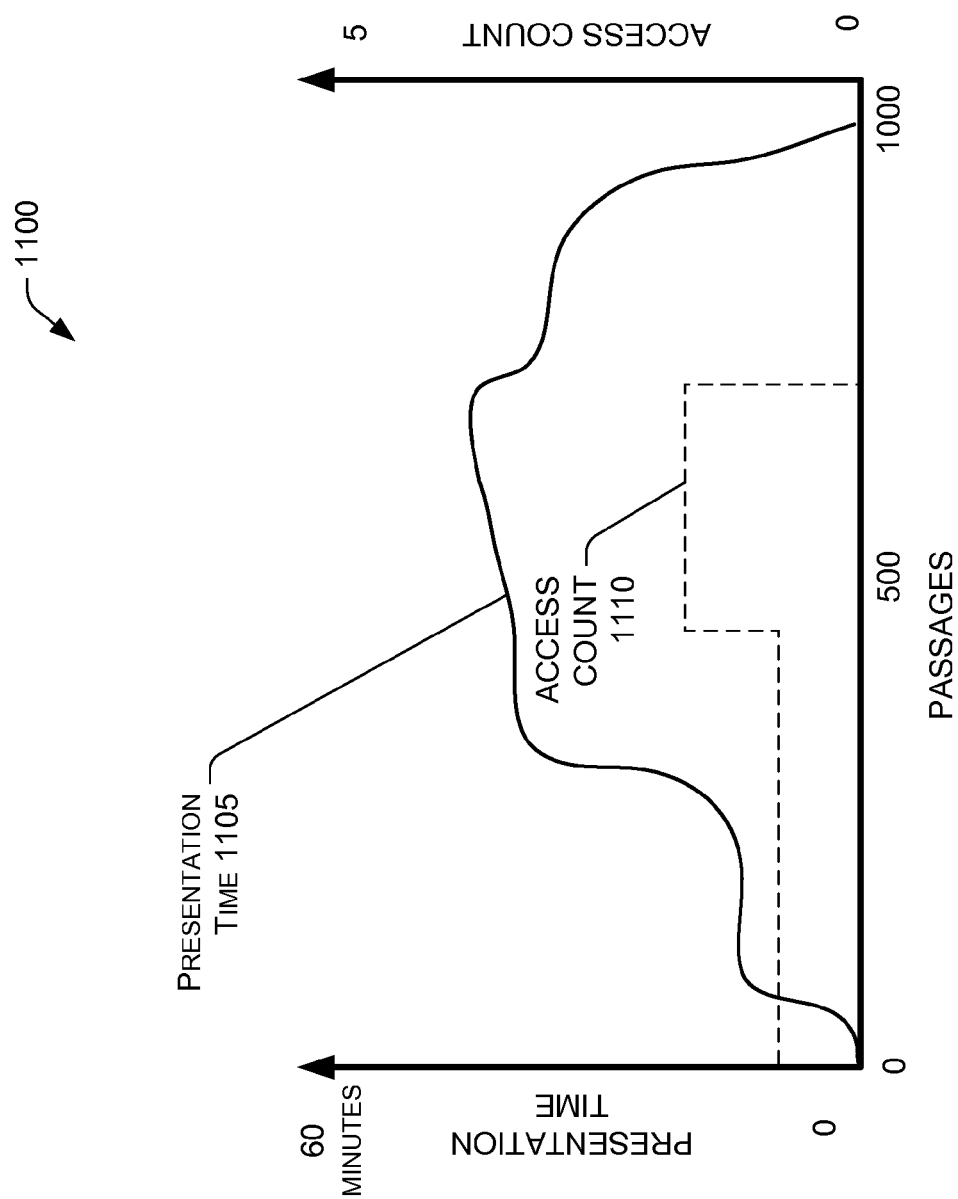
FIG. 11 shows a graph that presents user access behavior data for passages.

FIG. 11 shows a graph 1100 that presents user access behavior data for passages. Passage addresses are indicated along a horizontal axis. Presentation time and access counts are indicated along vertical axes. Accordingly, the graph 1100 shows presentation time for passages 1105 and access counts for passages 1110. In this graph 1100, the higher the presentation time 1105 and the access count 1110 for a passage, the higher a user's interest for the passage. For example, around passage seven hundred, access counts and presentation time are both maximized. Therefore, it may be determined that the user has favorite passages around passage seven hundred.

Figure 12:
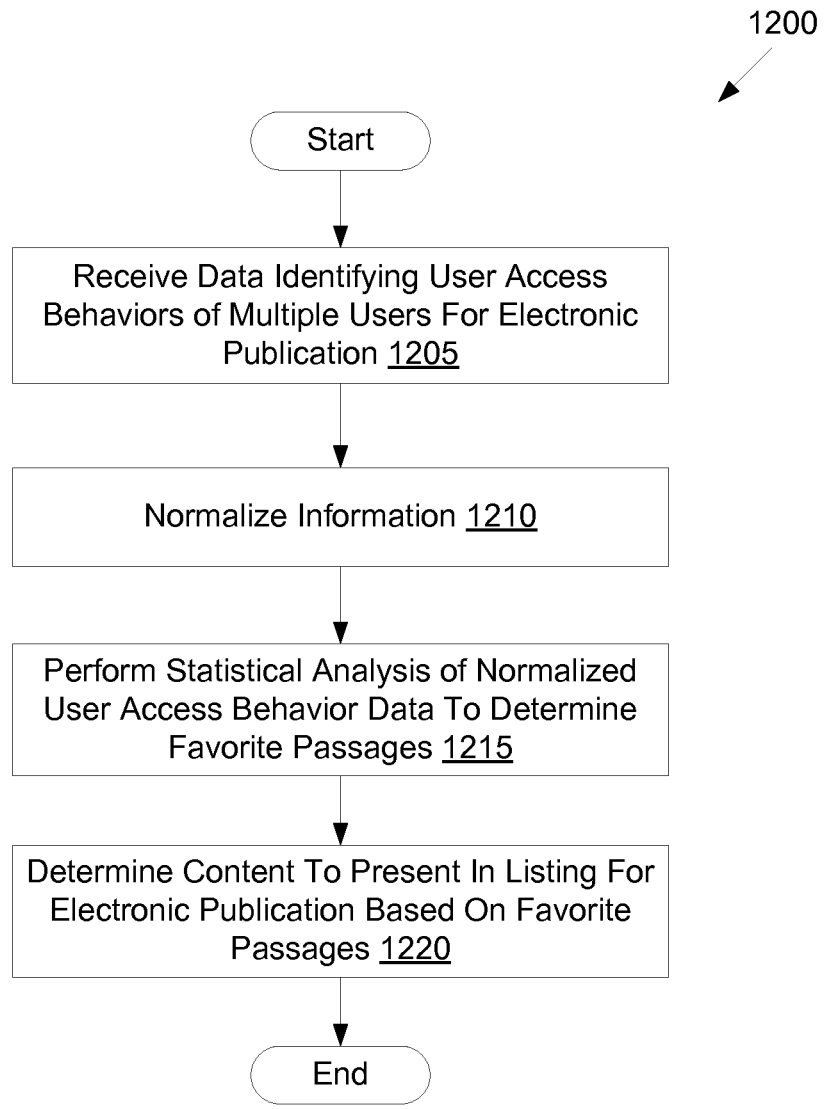
FIG. 12 is a flow diagram of one embodiment for a method of determining favorite passages of multiple users.

FIG. 12 is a flow diagram of another embodiment for a method 1200 of determining favorite passages of multiple users. The method is performed by processing logic that may comprise hardware (circuitry, dedicated logic, etc.), software (such as is run on a general purpose computer system or a dedicated machine), or a combination of both. In one embodiment, method 1200 is performed by a content providing system or by a component of a content providing system. For example, method 1200 may be performed by a content server 125 of content providing system 125 of FIG. 1. In one embodiment, processing logic includes one or more hardware or software modules, such as the modules of content server 400 of FIG. 4.

Referring to FIG. 12, at block 1205 of method 1200 processing logic receives information identifying user access behaviors of multiple users for an electronic publication. In one embodiment, at block 1210, processing logic normalizes the user access behavior data. In one embodiment, the user access behavior data is normalized by computing average passage presentation duration and average passage access counts for each user across multiple electronic publications. The access counts and presentation duration for each passage of the particular electronic publication for a user may then be divided by the average for that user to normalize these values with relation to other users.

At block 1215, processing logic performs statistical analysis of the normalized user access behavior data to determine favorite passages. Alternatively, processing logic may perform statistical analysis on non-normalized access behavior data. In one embodiment, processing logic determines favorite passages for each user, and then computes a histogram of favorite passages. The histogram may identify for each passage the number of users for whom that passage is a favorite passage. The passages that are favorite passages for the most users may then be identified as universal favorite passages.

At block 1220, processing logic determines content to present in a listing for an electronic publication based on the favorite passages. For example, processing logic may include excerpts from the electronic publication for that electronic publication's listing. Those displayed excerpts may include the favorite passages. In one embodiment, user access behavior data includes an identifier of a type of device that collected the user access behavior data. Accordingly, processing logic may separately determine favorite passages per device type in addition to overall favorite passages of a user. Processing logic may also report the favorite passages to authors and/or publishers of the electronic publication.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "tracking", "generating", "receiving", "storing", "presenting", "identifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, implemented by a user device, comprising:
presenting, by the user device, passages of an electronic book on the user device, wherein a first passage of the passages is associated with a sequence of location identifiers, each location identifier identifying a location of a word in the first passage;
tracking, by the user device, access behavior of a user for the passages of the electronic book by the user device, wherein tracking the access behavior of the user for the first passage comprises:
tracking an amount of time that the first passage is presented; and
tracking a number of times that the first passage is presented;
filtering out, by the user device, one or more of the passages based on a filtering criterion to result in one or more remaining passages;
identifying, by the user device, favorite passages of the electronic book from the one or more remaining passages based on the access behavior; and
generating, by the user device without user input, based on the identified favorite passages, markers that are usable to navigate to the favorite passages, wherein a first marker of the markers comprises at least one location identifier of the sequence of location identifiers for a location of a particular word in a favorite passage.

2. The method of claim 1, wherein the filtering criterion is a threshold, and wherein identifying the favorite passages comprises:
generating a score for each passage based on at least one of the amount of time that the passage was presented or the number of times that the passage was presented, wherein filtering out the one or more of the passages comprises filtering out those passages having scores that fail to satisfy the threshold;
ranking the remaining passages based on the scores; and
identifying highest ranked passages as the favorite passages.

3. The method of claim 2, further comprising:
computing the threshold based on additional access behavior of the user over a plurality of electronic books.

4. The method of claim 1, wherein tracking the access behavior further comprises:
using data from at least one of a motion sensor or a proximity sensor to determine, for each passage, whether the user device was held while the passage was presented.

5. The method of claim 1, further comprising:
reporting the favorite passages to a server.

6. The method of claim 1, wherein the favorite passages are favorite passages of the user, the method further comprising:
sharing the favorite passages with other users.

7. The method of claim 1, further comprising:
receiving, by the user device, information identifying additional access behavior of the passages of the electronic book on an additional user device; and
identifying the favorite passages based on the access behavior and the additional access behavior.

8. The method of claim 1, wherein the location identifiers each comprise an address based on a byte offset from a beginning of the electronic book, and wherein generating a marker for a favorite passage comprises generating a data structure that comprises contextual information about the favorite passage.

9. A method comprising:
receiving, by a processor executing a content server, information identifying access behavior of a plurality of users for a plurality of passages of an electronic book, wherein a first passage of the plurality of passages is associated with a sequence of location identifiers, each location identifier identifying a location of a word in the first passage;
normalizing the information by the processor;
performing, by the processor, statistical analysis of the information to determine favorite passages of the electronic book; and
providing, by the processor, a listing of the electronic book to a user device, the listing comprising a display of one or more of the favorite passages.

10. The method of claim 9, wherein the information identifies types of user devices on which the access behavior was tracked, the method further comprising:

identifying favorite passages associated with each type of user device.

11. An apparatus comprising:

a memory to store instructions for an access behavior tracking module; and a processor, coupled to the memory, to execute the instructions for the access behavior tracking module, wherein the processor is configured to:

track access behavior of a user for passages of an electronic book presented by the apparatus, wherein a first passage of the passages is associated with a sequence of location identifiers, each location identifier identifying a location of a word in the first passage, and wherein tracking the access behavior of the user for the first passage comprises:

tracking an amount of time that the first passage is presented; and tracking a number of times that the first passage is presented;

filter out one or more of the passages based on a filtering criterion to result in one or more remaining passages;

identify favorite passages of the electronic book from the one or more remaining passages based on the access behavior; and generate, without user input, based on the identified favorite passages, markers that are usable to navigate to the favorite passages, wherein a first marker of the markers comprises at least one location identifier of the sequence of location identifiers for a location of a particular word in a favorite passage.

12. The apparatus of claim 11, wherein the filtering criterion is a threshold, and wherein identifying the favorite passages comprises:

generating a score for each passage based on at least one of the amount of time that the passage was presented or the number of times that the passage was presented, wherein filtering out the one or more of the passages comprises filtering out those passages having scores that fail to satisfy the threshold;

ranking the remaining passages based on the scores; and identifying passages having scores that meet a score threshold as the favorite passages.

13. The apparatus of claim 11, further comprising:

at least one of a motion sensor or a proximity sensor to generate sensor data;

wherein tracking the access behavior further comprises using the sensor data from at least one of the motion sensor or the proximity sensor to determine, for each passage, whether the apparatus was held while the passage was presented.

14. The apparatus of claim 11, wherein the processor is further configured to:

store the favorite passages; and report the favorite passages to a server.

15. The apparatus of claim 11, wherein the processor is further configured to:

present a list of the favorite passages;

receive a user selection of a favorite passage; and open the electronic book to the selected favorite passage.

16. The apparatus of claim 11, wherein the processor is further configured to:

receive information identifying additional access behavior of the passages of the electronic book on an additional user device; and identify the favorite passages based on the access behavior and the additional access behavior.

17. An apparatus comprising:

a memory to store instructions for a data collection and analysis module; and a processor, coupled to the memory, to execute the instructions for the data collection and analysis module, wherein the processor is configured to:

receive information identifying favorite passages of a plurality of users for an electronic book;

normalize the information;

for each passage of the electronic book, count a number of users for which the passage is a favorite passage, wherein the passage is associated with a sequence of location identifiers, each location identifier identifying a location of a word in the passage;

identify passages having highest counts as universal favorite passages; and provide a listing of the electronic book to a user device, the listing comprising a purchase option and a display of one or more of the universal favorite passages.

18. The apparatus of claim 17, wherein the information identifies types of user devices associated with the favorite passages of the users, and the processor is further configured to determine different universal favorite passages for each type of user device.

19. A computer readable storage medium including instructions that, when executed by a processor, cause the processor to perform operations comprising:

presenting, by the processor, passages of an electronic book, wherein a first passage of the passages is associated with a sequence of location identifiers, each location identifier identifying a location of a word in the first passage;

tracking, by the processor, access behavior of a user for the passages, wherein tracking the access behavior of the user for the first passage comprises:

tracking an amount of time that the first passage is presented; and tracking a number of times that the first passage is presented;

filtering out, by the processor, one or more of the passages based on a filtering criterion to result in one or more remaining passages;

identifying, by the processor, favorite passages of the electronic book from the one or more remaining passages based on the access behavior;

generating, by the processor without user input, based on the identified favorite passages, markers that are usable to navigate to the favorite passages, wherein a first marker of the markers comprises at least one location identifier of the sequence of location identifiers for a location of a particular word in a favorite passage; and storing, by the processor, an identification of the favorite passages.

20. The computer readable storage medium of claim 19, wherein identifying the favorite passages comprises:

generating a score for each passage based on the amount of time that the passage was presented and the number of times that the passage was presented; and identifying passages having scores that meet a score threshold as the favorite passages.

21. The computer readable storage medium of claim 19, wherein tracking the access behavior further comprises:

using sensor data from at least one of a motion sensor or a proximity sensor to determine, for each passage, whether a user device was held while the passage was presented.

22. A computer readable storage medium including instructions that, when executed by a processor, cause the processor to perform operations comprising:

receiving, by the processor, information identifying access behavior of a plurality of users for a plurality of passages of an electronic book, wherein a first passage of the plurality of passages is associated with a sequence of location identifiers, each location identifier identifying a location of a word in the first passage;

normalizing the information by the processor;

performing, by the processor, statistical analysis of the normalized information to determine favorite passages of the electronic book; and providing, by the processor, a listing of the electronic book to a user device, the listing comprising a purchase option and a display of one or more of the favorite passages.

23. The computer readable storage medium of claim 22, wherein the information identifies types of user devices on which the access behavior was tracked, the method further comprising:

identifying favorite passages associated with each type of user device.

\* \* \* \* \*